United States Patent
Taslimi et al.

(10) Patent No.: US 12,355,709 B2
(45) Date of Patent: *Jul. 8, 2025

(54) METHOD AND SYSTEM FOR CHATBOT-ENABLED WEB FORMS AND WORKFLOWS

(71) Applicant: Nintex Pty Ltd., Melbourne (AU)

(72) Inventors: Vahid Taslimi, Melbourne (AU); Manvik Kathuria, Melbourne (AU); Craig Harrowfield, Melbourne (AU)

(73) Assignee: NINTEX PTY LTD, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,601

(22) Filed: Aug. 10, 2023

(65) Prior Publication Data
US 2024/0154920 A1    May 9, 2024

Related U.S. Application Data

(63) Continuation of application No. 16/975,995, filed as application No. PCT/IB2019/051514 on Feb. 26, 2019, now Pat. No. 11,765,104.

(51) Int. Cl.
*H04L 51/02* (2022.01)
*G10L 15/06* (2013.01)
*G10L 15/18* (2013.01)

(52) U.S. Cl.
CPC .............. *H04L 51/02* (2013.01); *G10L 15/06* (2013.01); *G10L 15/1822* (2013.01)

(58) Field of Classification Search
CPC ..... H04L 51/02; G10L 15/06; G10L 15/1822; G06F 40/35; G06F 40/174

USPC ........................................................ 704/231
See application file for complete search history.

(56) References Cited

U.S. PATENT DOCUMENTS

| 5,915,001 | A |   | 6/1999 | Uppaluru |   |
|---|---|---|---|---|---|
| 7,346,840 | B1 | * | 3/2008 | Ravishankar | G06F 16/958 707/E17.116 |
| 8,683,315 | B2 | * | 3/2014 | Stover | G06F 3/0482 715/222 |

(Continued)

FOREIGN PATENT DOCUMENTS

| WO | 2018013702 A1 | 1/2018 |
|---|---|---|
| WO | 2019162921 A1 | 8/2019 |

OTHER PUBLICATIONS

International Searching Authority, International Search Report and Written Opinion, PCT Patent Application PCT/IB2019/051514, mailed Jul. 1, 2019, 7 pages.

*Primary Examiner* — Thuykhanh Le
(74) *Attorney, Agent, or Firm* — Perkins Coie LLP

(57) ABSTRACT

Systems and methods for creating chatbot-enabled web forms and workflows, the method comprising, mapping web forms and workflows to intents, wherein the web forms have required fields to be completed and the workflows have required tasks to be performed; mapping the required fields and the required tasks to entities for the intents that map to the web forms and the workflows; mapping utterances to complete the required fields and perform the required tasks to the intents and the entities that map to the web forms and the workflows; and creating chatbots configured to assist users to complete the required fields and perform the required tasks using the utterances, the intents and the entities that map to the web forms and the workflows.

20 Claims, 9 Drawing Sheets

(56) References Cited

U.S. PATENT DOCUMENTS

| | | | |
|---|---|---|---|
| 8,813,178 B1* | 8/2014 | Khanna | G06Q 10/10 |
| | | | 726/8 |
| 9,317,837 B2* | 4/2016 | Cok | G06Q 10/103 |
| 10,025,567 B2* | 7/2018 | Balasubramanian | G06F 8/34 |
| 10,521,946 B1* | 12/2019 | Roche | G10L 13/00 |
| 10,732,708 B1* | 8/2020 | Roche | G10L 15/22 |
| 10,762,286 B2* | 9/2020 | Kolesov | G06F 40/106 |
| 11,232,645 B1* | 1/2022 | Roche | G06V 20/20 |
| 11,294,975 B1 | 4/2022 | Devageorge et al. | |
| 11,765,104 B2 | 9/2023 | Taslimi et al. | |
| 2003/0195751 A1 | 10/2003 | Schwenke et al. | |
| 2005/0050093 A1 | 3/2005 | Atkin et al. | |
| 2006/0007189 A1 | 1/2006 | Gaines, III et al. | |
| 2007/0245308 A1* | 10/2007 | Hill | G06F 40/169 |
| | | | 717/114 |
| 2007/0276689 A1* | 11/2007 | Slone | G06F 3/04817 |
| | | | 717/109 |
| 2008/0301313 A1 | 12/2008 | Bhogal et al. | |
| 2010/0104087 A1 | 4/2010 | Byrd et al. | |
| 2011/0106779 A1 | 5/2011 | George et al. | |
| 2012/0041903 A1 | 2/2012 | Beilby et al. | |
| 2012/0136756 A1 | 5/2012 | Jitkoff et al. | |
| 2013/0036456 A1* | 2/2013 | Boysen | G06Q 20/38215 |
| | | | 726/4 |
| 2013/0290234 A1 | 10/2013 | Harris et al. | |
| 2013/0299569 A1* | 11/2013 | Gentile | G06Q 10/08 |
| | | | 235/375 |
| 2014/0074550 A1* | 3/2014 | Chourey | G06Q 30/02 |
| | | | 705/7.29 |
| 2014/0188585 A1 | 7/2014 | Thompson et al. | |
| 2014/0257788 A1 | 9/2014 | Xiong et al. | |
| 2014/0258826 A1 | 9/2014 | Barrus et al. | |
| 2014/0258828 A1 | 9/2014 | Lymer et al. | |
| 2014/0365214 A1 | 12/2014 | Bayley | |
| 2015/0039987 A1 | 2/2015 | Soulier | |
| 2015/0149168 A1* | 5/2015 | Stent | G10L 15/22 |
| | | | 704/235 |
| 2015/0302855 A1 | 10/2015 | Kim et al. | |
| 2015/0356971 A1* | 12/2015 | Stolcke | H04N 7/183 |
| | | | 704/231 |
| 2015/0379074 A1 | 12/2015 | Marschner et al. | |
| 2016/0011905 A1 | 1/2016 | Mishra et al. | |
| 2016/0012465 A1* | 1/2016 | Sharp | G06Q 20/321 |
| | | | 705/14.17 |
| 2016/0063416 A1* | 3/2016 | Sharma | G06Q 10/06313 |
| | | | 705/7.23 |
| 2017/0116177 A1 | 4/2017 | Walia | |
| 2017/0147554 A1 | 5/2017 | Chen et al. | |
| 2017/0192950 A1* | 7/2017 | Gaither | G10L 15/22 |
| 2017/0228367 A1 | 8/2017 | Pasupalak et al. | |
| 2017/0237692 A1* | 8/2017 | Sheth | H04L 51/04 |
| | | | 715/758 |
| 2017/0242886 A1 | 8/2017 | Jolley et al. | |
| 2017/0289332 A1* | 10/2017 | Lavian | H04M 3/4938 |
| 2018/0025726 A1* | 1/2018 | Gatti de Bayser | G10L 15/22 |
| | | | 704/257 |
| 2018/0107461 A1* | 4/2018 | Balasubramanian | G06F 8/38 |
| 2018/0121066 A1* | 5/2018 | Kato | G06F 3/04883 |
| 2018/0144750 A1* | 5/2018 | Storti | H04B 11/00 |
| 2018/0191643 A1* | 7/2018 | Berry | H04L 51/216 |
| 2018/0301222 A1* | 10/2018 | Dew, Sr. | G16H 15/00 |
| 2018/0302346 A1 | 10/2018 | Xie | |
| 2019/0042663 A1* | 2/2019 | Gupta | G06F 40/40 |
| 2019/0051301 A1* | 2/2019 | Locascio | G06V 40/172 |
| 2019/0066694 A1* | 2/2019 | Hirzel | G10L 17/22 |
| 2019/0082043 A1 | 3/2019 | Lavian et al. | |
| 2019/0102078 A1* | 4/2019 | Bhatt | G06F 3/0481 |
| 2019/0147033 A1* | 5/2019 | Morse | G06Q 30/0621 |
| | | | 715/222 |
| 2019/0179877 A1* | 6/2019 | Kato | G06F 40/174 |
| 2019/0179885 A1* | 6/2019 | Wong | G06F 40/106 |
| 2019/0182184 A1* | 6/2019 | Myung | H04L 51/02 |
| 2019/0182382 A1* | 6/2019 | Mazza | H04M 3/527 |
| 2019/0187961 A1* | 6/2019 | Myung | G06F 3/0482 |
| 2019/0197103 A1 | 6/2019 | Kröner et al. | |
| 2020/0372205 A1 | 11/2020 | Bradley et al. | |
| 2021/0065121 A1 | 3/2021 | Brehmer et al. | |
| 2021/0075749 A1* | 3/2021 | Viswanathan | G06F 9/50 |
| 2021/0174800 A1 | 6/2021 | Srinivasan | |
| 2022/0300306 A1* | 9/2022 | Leung | G06N 5/04 |

\* cited by examiner

Bot builder

Enable chatbot
Fill in your form from chat services such as Skype, Microsoft Teams and Slack.

Chatbot enabler

Form controls used in the chatbot (Entities)
Entities are the nouns used in the chatbot and are taken from the form's required fields.

| Entity | Type | Synonyms |
|---|---|---|
| Start date | #Date | Automatic – bot understands this data type |
| End date | #Date | Automatic – bot understands this data type |
| Leave type | #Leave type | Manual<br>Please enter alternate terms or synonyms |
| ↳ Annual | | Example for Vacation "Holiday, time off, PTO" |
| ↳ Carer's | | parent, guardian |
| ↳ Sick | | sickie, illness |

METHOD AND SYSTEM FOR CHATBOT-ENABLED WEB FORMS AND WORKFLOWS

CROSS-REFERENCE TO RELATED APPLICATION(S)

This application is a continuation of U.S. Non-Provisional application Ser. No. 16/975,995, filed Aug. 26, 2020 (U.S. Pat. No. 11,765,104) and titled "Method and System for Chatbot-Enabled Web Forms and Workflows," which is a National Stage Entry of and claims priority to International App. No. PCT/IB2019/051514, filed Feb. 26, 2019, titled "Method and System for Chatbot-Enabled Web Forms and Workflows," which claims priority under 35 U.S.C. Section 119(e) to Australia Provisional Application 2018900610, filed Feb. 26, 2018, titled "Method and System for Chatbot-Enabled Web Forms and Workflows," the contents all of which are incorporated by reference herein as though set forth in their entirety and to which priority and benefit are claimed.

TECHNICAL FIELD

The present invention relates to a method and system for chatbot-enabled web forms and workflows.

BACKGROUND

The present applicant has developed a number of no-code (or code-free), intuitive, drag-and-drop tools, such as Nintex® Forms and Nintex® Workflow, that enable non-coding business users to create, publish and manage web forms and business workflows without needing to code from scratch.

Chatbots are increasingly being used for various practical purposes, such as walking users through business processes. Implementing chatbots for business processes, however, typically involves significant coding effort that is beyond the capabilities of most non-coding business users.

It is desirable to provide intuitive, no-code solutions that enable non-coding business users to create and deploy chatbots (or artificial intelligence (AI) assistants) to assist users to complete web forms and perform workflows.

SUMMARY OF THE DISCLOSURE

According to the present invention, there is provided a method for creating chatbot-enabled web forms and workflows, the method comprising: mapping web forms and workflows to intents, wherein the web forms have required fields to be completed and the workflows have required tasks to be performed; mapping the required fields and the required tasks to entities for the intents that map to the web forms and the workflows; mapping utterances to complete the required fields and perform the required tasks to the intents and the entities that map to the web forms and the workflows; creating chatbots configured to assist users to complete the required fields and perform the required tasks using the utterances, the intents and the entities that map to the web forms and the workflows.

The chatbots may be further configured to assist the users to discover the web forms and the workflows based on recognizing the intents and the entities in the utterances.

The chatbots may be further configured to trigger the workflows and performance of the required tasks based on recognizing the intents and the entities in the utterances.

The chatbots may be further configured to confirm completion of the required fields and performance of the required tasks based on recognizing the intents and the entities in the utterances.

The method may further comprise mapping confirmation messages confirming completion of the required fields and performance of the required tasks to the intents and the entities that map to the web forms and the workflows.

The mapping of the intents, the entities, the utterances, and the confirmation messages to the web forms and the workflows may be performed using graphical user interfaces (GUI) without coding.

The present invention also provides a system for creating chatbot-enabled web forms and workflows, the system comprising: a memory to store instructions; one or more processors to execute instructions stored in the memory to: map web forms and workflows to intents, wherein the web forms have required fields to be completed and the workflows have required tasks to be performed; map the required fields and the required tasks to entities for the intents that map to the web forms and the workflows; map utterances to complete the required fields and perform the required tasks to the intents and the entities that map to the web forms and the workflows; create chatbots configured to assist users to complete the required fields and perform the required tasks using the utterances, the intents and the entities that map to the web forms and the workflows.

The present invention further provides a non-transitory machine-readable medium storing instructions which, when executed by one or more processors, cause the one or more processors to perform operations comprising: mapping web forms and workflows to intents, wherein the web forms have required fields to be completed and the workflows have required tasks to be performed; mapping the required fields and the required tasks to entities for the intents that map to the web forms and the workflows; mapping utterances to complete the required fields and perform the required tasks to the intents and the entities that map to the web forms and the workflows; creating chatbots configured to assist users to complete the required fields and perform the required tasks using the utterances, the intents and the entities that map to the web forms and the workflows.

The present invention also provides a chatbot for completing web forms or performing workflows created by the method or the system described above.

The present invention further provides a chatbot-enabled web form or a chatbot-enabled workflow created by the method or the system described above.

BRIEF DESCRIPTION OF THE DRAWINGS

Embodiments of the invention will now be described by way of example only with reference to the accompanying drawings, in which:

FIGS. 2-4 are example GUIs generated by an example chatbot creation engine for creating chatbots for web forms and workflows according to an example embodiment of the present invention;

DETAILED DESCRIPTION OF EMBODIMENTS

The terms used in this specification generally have their ordinary, conventional meanings in the fields of natural language processing, web forms and business workflows. For example, the term "required field" means that the field is required based on whatever business rule is in place at the time. For a web form, a field may be required because the form designer enable a flag to say required, or it could be based on a business rule (defined in the form or workflow) that makes a filed required for capturing input from the end user. Similarly, a "task" means any action that requires user input. For example, if there is a workflow and a question is asked or user input is required, then that is considered a task. The workflow will pause until the user responds or until a predefined timeout without any response.

Figure 1:
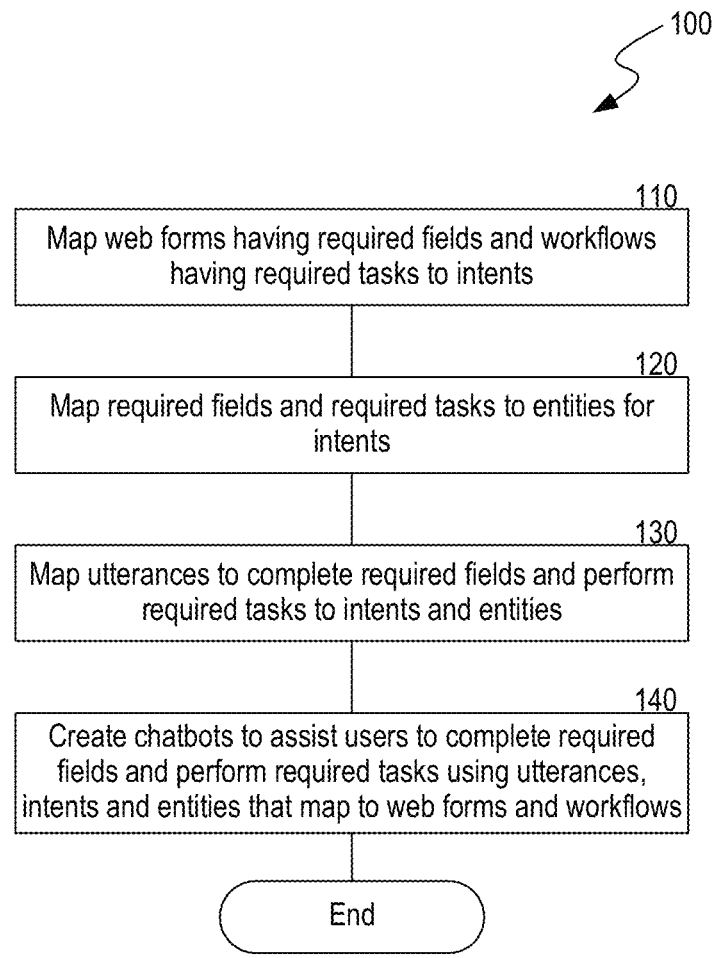
FIG. 1 is an example flow chart of a method for chatbot-enabled web forms and workflows according to an example embodiment of the present invention.

Referring to FIG. 1, an example method 100 for chatbot-enabled web forms and workflows according to an example embodiment of the present invention starts at step 110 by mapping web forms and workflows to intents. The web forms and the workflows may be been respectively pre-defined with required fields to be completed and required tasks to be performed. An intent may represent an action that a user want to perform or the purpose of a user's input, for example, a user wants to apply for leave. Intents may be denoted by the hashtag symbol. In the leave example, web forms and workflows relating to leave applications may be mapped to the intent of #leave. The leave web forms and workflows may have been pre-defined (or created) and published using web form and workflow engines, such as such as Nintex® Forms and Nintex® Workflow.

Next, at step 120, the required fields and the required tasks may be mapped to entities for the intents that map to the web forms and the workflows. An entity may represent a term, data type, object or control that is relevant to a user's intent and that provides specific context for an intent. Entities may use the @symbol. For example, an entity may represent a type of leave, or a start date or end date for the leave.

Next, at step 130, utterances to complete the required fields and perform the required tasks may be mapped to the intents and the entities that map to the web forms and the workflows. An utterance is a phrase or sentence that a user might say that maps to an intent and/or individual entities of the intent. For example, the utterance "I want to go on vacation next Monday" may map to both the intent of #leave and the individual entities of @leave type and @start date.

The method 100 ends at step 140 by creating chatbots configured to assist users to complete the required fields and perform the required tasks using the utterances, the intents and the entities that map to the web forms and the workflows.

The method 100 may further comprise mapping confirmation messages confirming completion of the required fields and performance of the required tasks to the intents and the entities that map to the web forms and the workflows. The confirmation messages may comprise sentences or statements to confirm or verify a user's input for the intents and the entities that map to the web forms and the workflows.

Figure 3:
Figure 4:
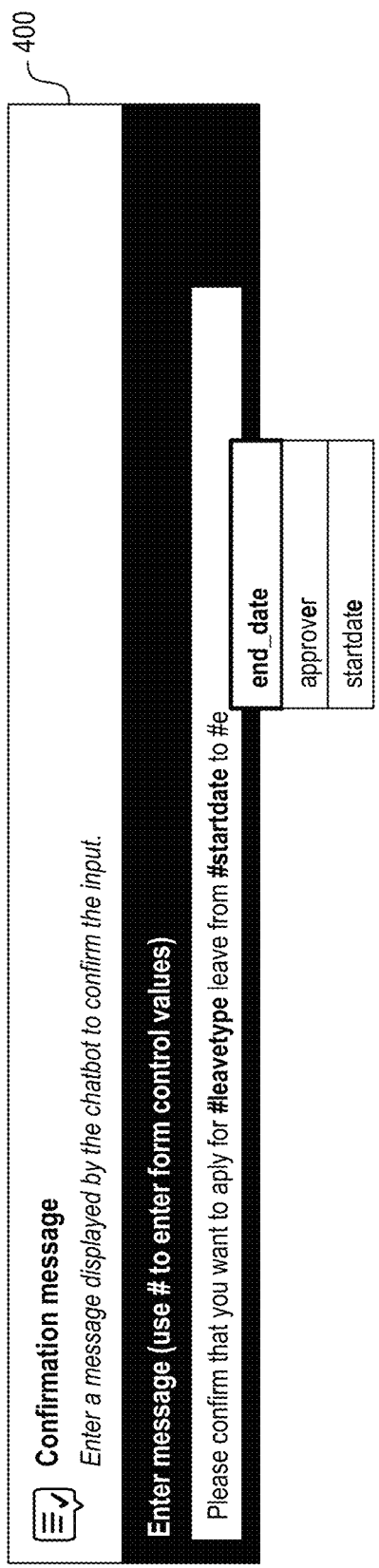

Referring to FIGS. 2-4, the mapping of the intents, the entities, the utterances, and the confirmation messages to the web forms and the workflows may be performed using pre-configured GUIs without coding. The GUIs may be implemented in a chatbot creation engine (or bot builder). FIG. 2 illustrates an example GUI 200 for mapping required fields of an example leave application web form to entities. The mapping may be performed automatically by the chatbot creation engine based on predefined mapping rules that automatically map the required fields to the entities, and/or manually map the required fields to the entities based on user input of alternative terms or synonyms.

FIG. 3 illustrates an example GUI 300 for mapping example utterances to complete the required fields to the entities that map to the leave application web form. The mapping may, for example, be performed using automatically generated part-of-speech tags and suggested synonyms.

FIG. 4 illustrates an example GUI 400 for mapping confirmation messages confirming completion of the required fields to the intents and the entities that map to the leave web form. The mapping may, for example, be performed using automatically generated part-of-speech tags and/or suggested synonyms.

Figure 5:
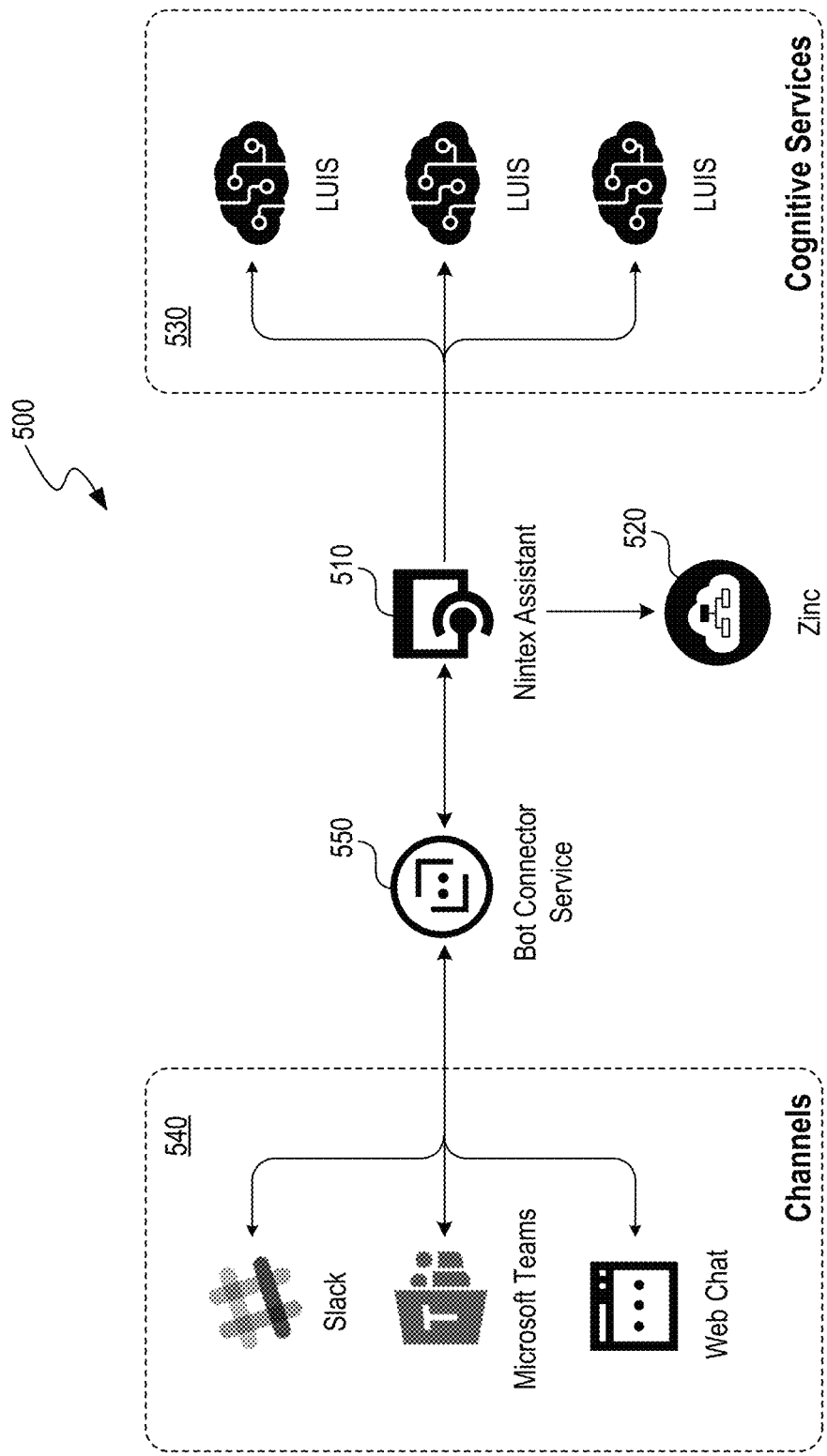
FIG. 5 is an example high level architecture diagram illustrating an example system for chatbot-enabled web forms and workflows according to an example embodiment of the present invention.

FIG. 5 is an example high level architecture diagram illustrating an example system 500 for chatbot-enabled web forms and workflows. The system 500 may comprise a chatbot (or AI assistant) 510 (eg, Nintex® Assistant) for completing web forms and performing workflows created by the method 100 and the no-code chatbot creation engine described above. The chatbot 510 may be connected to web form and/or workflow engines 520 (eg, Nintex® Forms), cognitive services or natural language (NLP) engines 530 (eg, such as Language Understanding Intelligent Service (LUIS)). The chatbot 510 may be deployed in channels 540 via a bot connector service 550. The deployment channels 540 for the chatbot 510 may, for example, comprise team messaging applications (eg, Slack), chat-based hubs for teamwork (eg, Microsoft® Teams), and web chat widgets.

The chatbots 510 created by the method 100 and the chatbot creation engine described above may be further configured to provide additional chat-enabled functionality to users. FIGS. 6-9 illustrate example data flows in the system 500 between the chatbot 510, participants 600 in workflows (and/or users of web forms), the NLP engine 530, and the workflow engine 520 for different chatbot-enabled functionalities.

Figure 6:
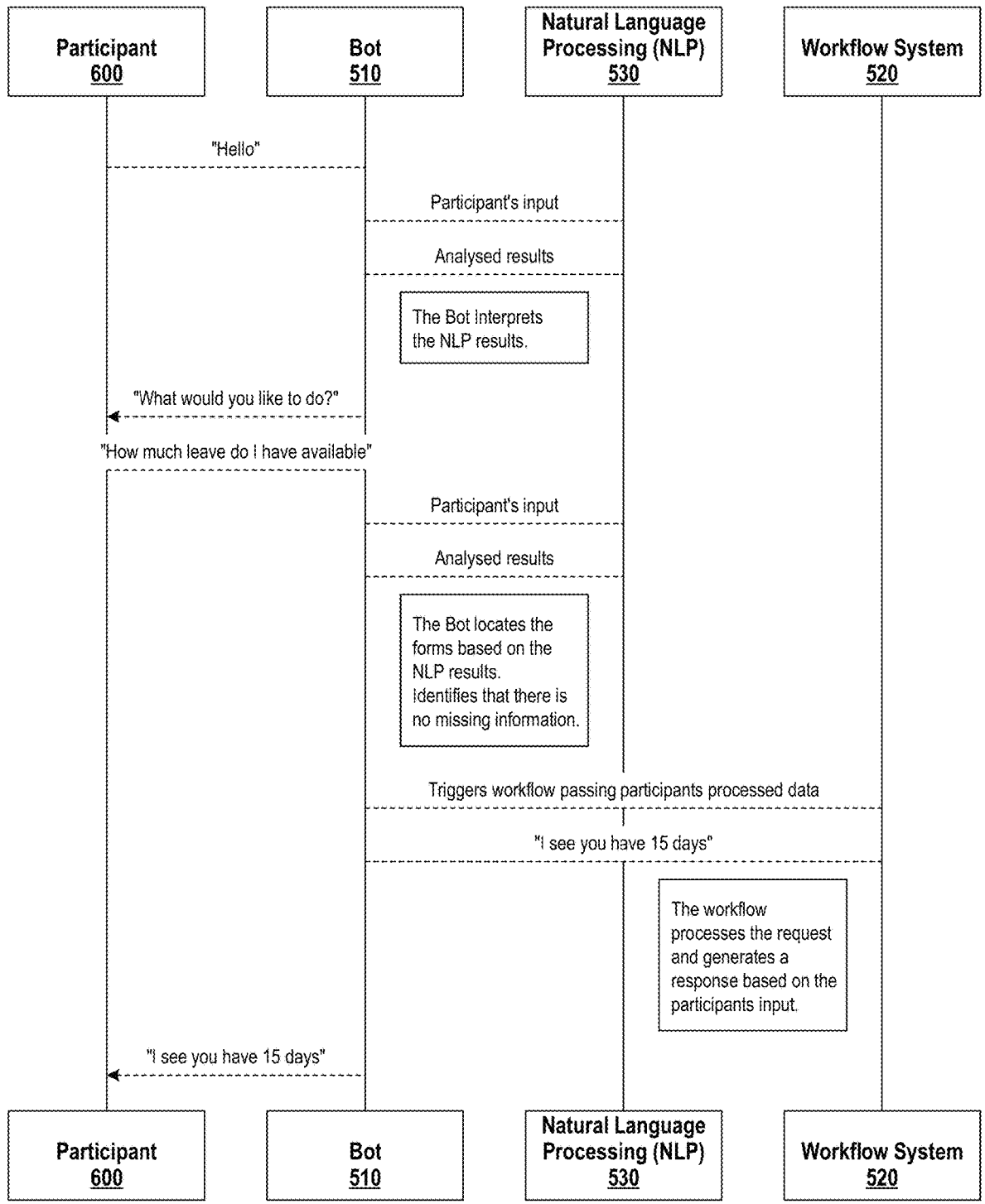
FIGS. 6-9 are example data flow diagrams for chatbot-enabled web forms and workflows according to an example embodiment of the present invention.

For example, as illustrated in FIG. 6, the chatbot 510 may be configured to discover or identify the web forms and the workflows in the workflow engine 520 based on the NLP engine 530 recognizing the intents and the entities in the utterances of the participant 600.

Figure 7:
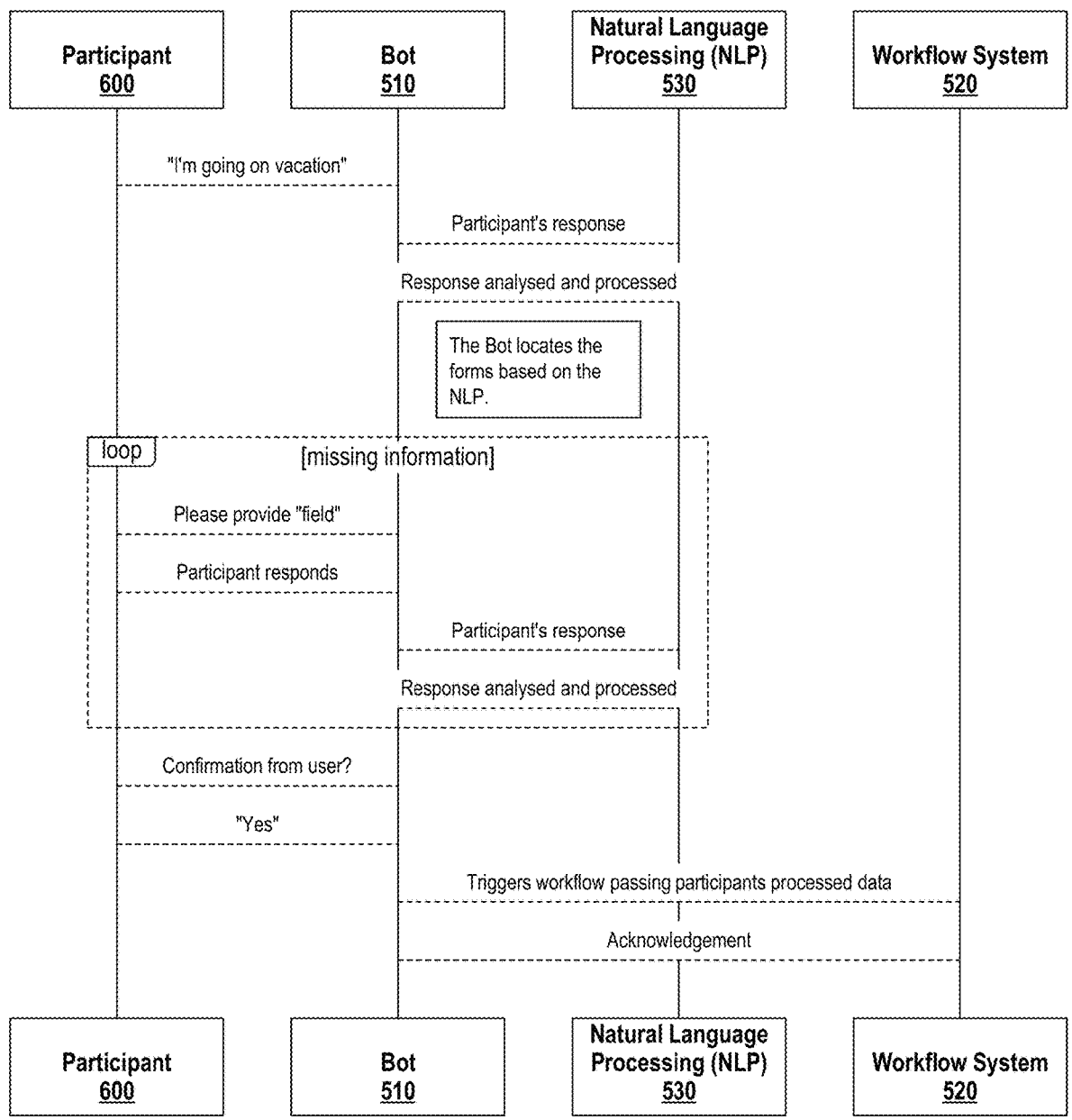
Figure 8:
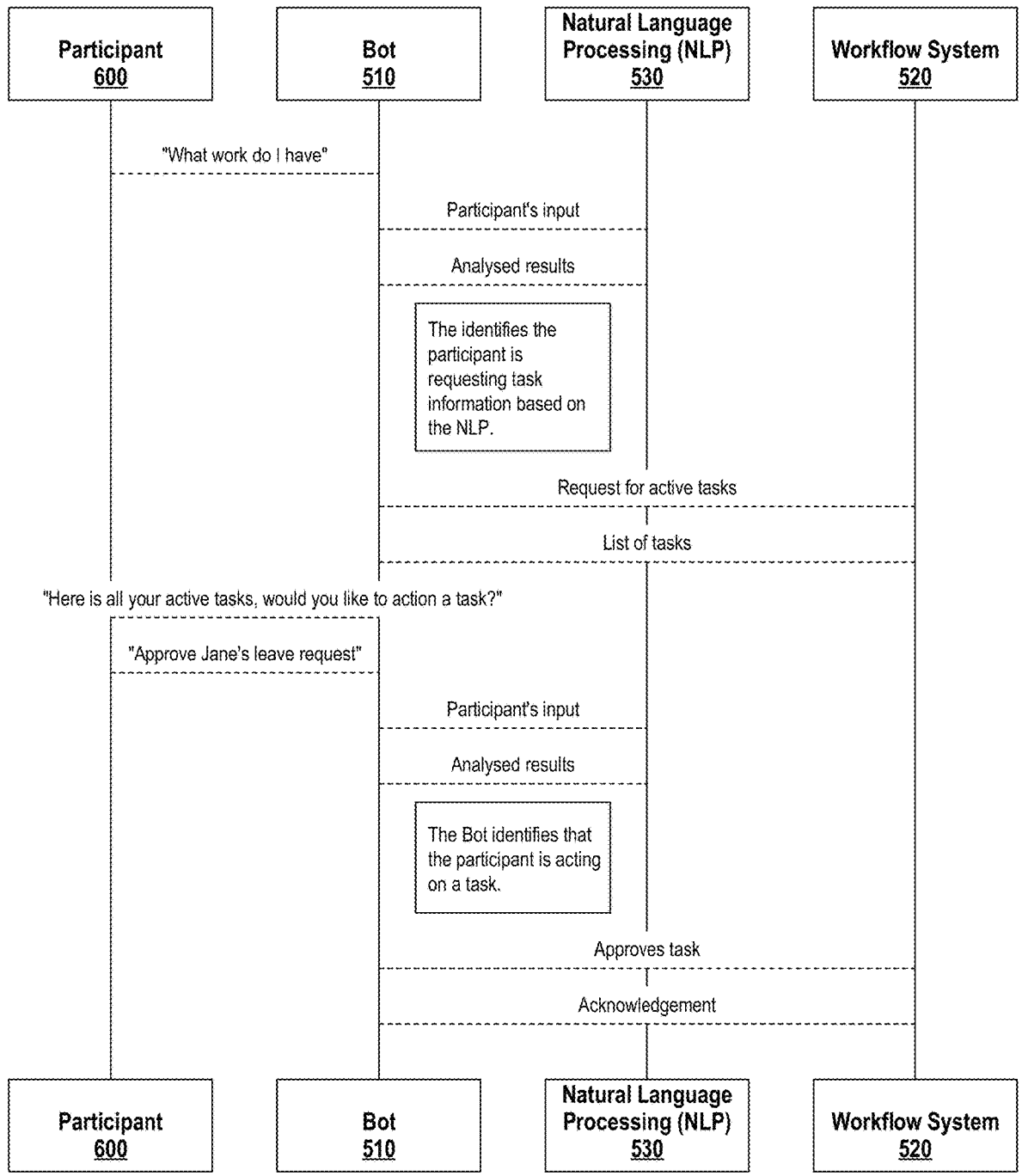

As illustrated in FIG. 7 and FIG. 8, the chatbot 510 may be further configured to identify participants 600 in the workflows, trigger the workflows and performance of the required tasks by the participants 600 in the workflow engine 520 based on the NLP engine 530 recognizing the intents and the entities in the utterances of the participants 600.

Figure 9:
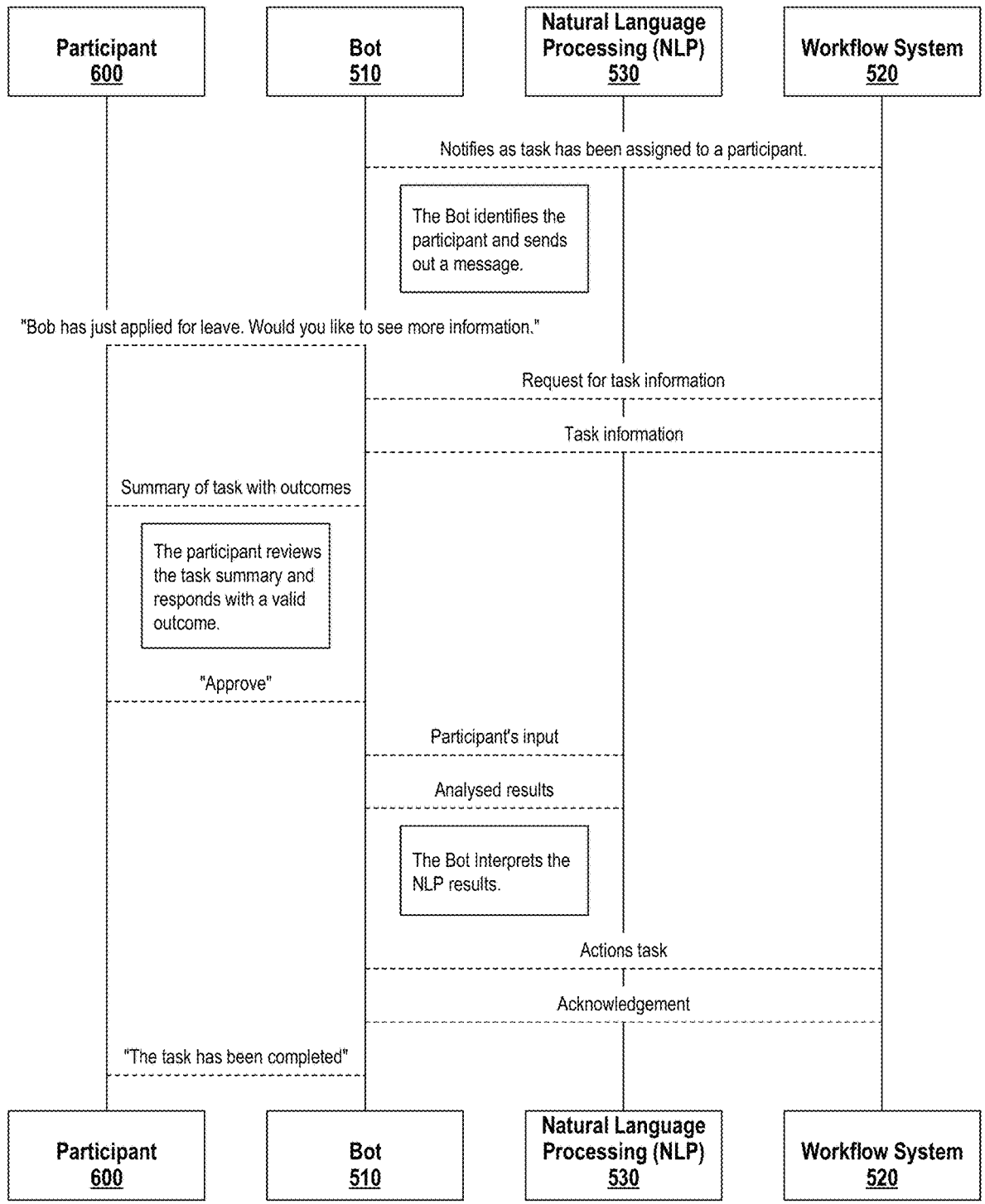

Referring to FIG. 9, the chatbots 510 may be further configured to send messages, initiate reviews, and interpret results or outcomes of workflows and required tasks in the workflow engine 520 based on the NLP engine 530 recognizing the intents and the entities in the utterances of the participants 600.

Embodiments of the present invention provide intuitive, no-code chatbot creation engines that are both generally and specifically useful for chatbot-enabling web forms and workflows.

For the purpose of this specification, the word "comprising" means "including but not limited to," and the word "comprises" has a corresponding meaning.

The above embodiments have been described by way of example only and modifications are possible within the scope of the claims that follow.

What is claimed is:

1. A method for creating chatbot-enabled programmatic web forms, the method comprising:
   obtaining (1) a set of web forms and (2) at least one chatbot;
   receiving a set of utterances from a user; and
   for each utterance in the received set of utterances:
      identifying (1) at least one intent and (2) at least one entity from the utterance,
         wherein the at least one entity is associated with fulfilling the at least one intent;
      generating a mapping of the identified at least one intent to one or more web forms of the set of web forms,
         wherein each of the set of web forms have required fields to be completed; and
      using the generated mapping of the identified at least one intent, generating at least one chatbot-enabled webform configured to assist the user to complete one or more required fields of the one or more web forms.

2. The method of claim 1,
   wherein generating the mapping further comprising a mapping of the identified at least one entity to the one or more web forms of the set of web forms.

3. The method of claim 1, wherein the at least one intent is denoted by a hashtag symbol.

4. The method of claim 1, wherein the at least one entity is denoted by a special symbol.

5. The method of claim 1, further comprising: mapping confirmation messages confirming completion of the one or more required fields of the one or more web forms.

6. The method of claim 5, wherein the mapping of the confirmation messages is performed via graphical user interfaces (GUI).

7. The method of claim 1, wherein the at least one chatbot is further configured to complete the one or more required fields of the one or more web forms.

8. The method of claim 1, wherein generating the mapping of the identified at least one intent to the one or more web forms further comprises:
   using predefined mapping rules, mapping (1) the at least one entity to (1) one or more required fields of the one or more web forms.

9. At least one non-transitory, computer-readable medium carrying instructions, which when executed by at least one data processor, performs operations for creating chatbot-enabled programmatic web forms and programmatic workflows, the operations comprising:
   obtaining (1) a set of web forms and (2) at least one chatbot;
   receiving a set of utterances from a user; and
   for each utterance in the received set of utterances:
      identifying at least one intent from the utterance;
      generating a mapping of the identified at least one intent to one or more programmatic workflows within a web form of the set of web forms,
         wherein each of the set of web forms have required fields to be completed, and
         wherein each of the set of programmatic workflows have required tasks to be performed; and
      using the generated mapping of the identified at least one intent, generating at least one chatbot-enabled webform configured to assist the user to perform one or more required tasks of the one or more programmatic workflows.

10. The at least one non-transitory, computer-readable medium of claim 9,
   wherein the operations further comprise: identifying at least one entity from the utterance, and
   wherein the at least one entity is associated with fulfilling the at least one intent.

11. The at least one non-transitory, computer-readable medium of claim 10, wherein the at least one entity is denoted by a special symbol.

12. The at least one non-transitory, computer-readable medium of claim 9, wherein the operations further comprise:
   identifying at least one entity from the utterance,
      wherein generating the mapping further comprising a mapping of the identified at least one entity to the programmatic workflow within the web form of the set of web forms.

13. The at least one non-transitory, computer-readable medium of claim 9, wherein the at least one intent is denoted by a hashtag symbol.

14. The at least one non-transitory, computer-readable medium of claim 9, wherein the operations further comprise: mapping confirmation messages confirming performance of the one or more required tasks of the one or more programmatic workflows.

15. The at least one non-transitory, computer-readable medium of claim 14, wherein the mapping of the confirmation messages is performed via graphical user interfaces (GUI).

16. The at least one non-transitory, computer-readable medium of claim 9, wherein the at least one chatbot is further configured to perform of the one or more required tasks of the one or more programmatic workflows.

17. A system for creating chatbot-enabled programmatic web forms and programmatic workflows comprising a non-transitory computer-readable medium having instructions stored thereon, which when executed by one or more processors of the system cause the system to:
   obtaining (1) a set of web forms, (2) a programmatic workflow, and (3) at least one chatbot;
   receive a set of utterances from a user; and
   for each utterance in the received set of utterances:
      identify (1) at least one intent and (2) at least one entity from the utterance, wherein the at least one entity is associated with fulfilling the at least one intent;
      generate a mapping of the identified at least one intent to one or more web forms of the set of web forms and one or more programmatic workflows of a set of programmatic workflows,
         wherein each of the set of web forms have required fields to be completed, and
         wherein each of the set of programmatic workflows have required tasks to be performed; and
      using the generated mapping of the identified at least one intent, generate at least one chatbot-enabled application configured to assist the user to complete one or more required fields of the one or more web forms and perform one or more required tasks of the one or more programmatic workflows.

18. The system of claim 17,
   wherein generating the mapping further comprising a mapping of the identified at least one entity to one or more of: the one or more web forms of the set of web forms, the one or more programmatic workflows of the set of programmatic workflows, or both.

19. The system of claim 17, wherein the at least one intent is denoted by a hashtag symbol.

20. The system of claim 17, wherein the instructions when executed by the one or more processors of the system further cause the system to: map confirmation messages confirming: completion of the one or more required fields of the one or more web forms or performance of the one or more required tasks of the one or more programmatic workflows, or both.

\* \* \* \* \*